July 8, 1941.   L. JURAK   2,248,272
MAGNETIZING OF ANNULAR MAGNETS
Filed Feb. 23, 1939
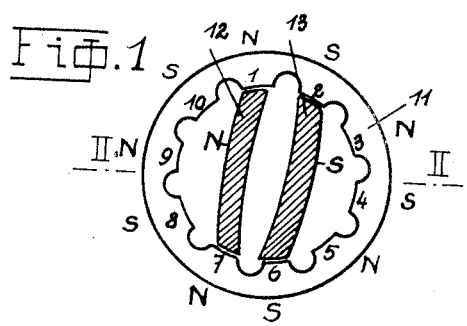
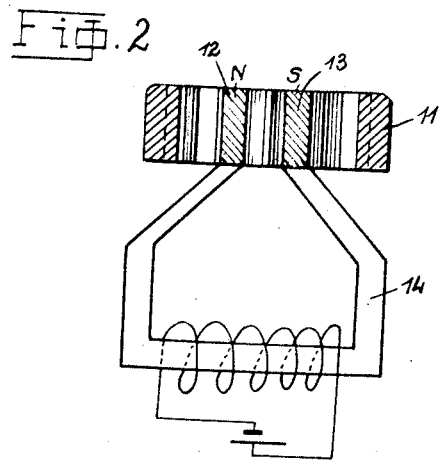
Inventor
Ladislav Jurak
By Glascock Downing & Seebrey
Attys.

Patented July 8, 1941

2,248,272

UNITED STATES PATENT OFFICE 2,248,272

MAGNETIZING OF ANNULAR MAGNETS

Ladislav Jurák, Brunn-Turany, Czechoslovakia

Application February 23, 1939, Serial No. 258,053
In Czechoslovakia February 16, 1938

1 Claim. (Cl. 175—21)

The present invention relates to a method of magnetizing magnets having annularly arranged polar projections.

Annular magnets which have the poles disposed on the inner side and which are made of material of high coercivity, for instance of alloys of iron, aluminium and nickel, are very difficult to magnetize, and such magnets with more than four poles and an internal diameter of less than 50 millimetres can hardly be fully magnetized.

By the present invention such magnets can be satisfactorily manufactured. The new method of magnetization is based upon the feature that the poles are not all saturated at once by a magnetic flux, but in portions, only such a part of the magnet being magnetized at a time as admits of being sufficiently magnetized by the polar projections of the magnetizing apparatus. The various objects and features of the invention will be more apparent from a consideration of the annexed drawing and the following description wherein exemplary apparatus for carrying out the invention is disclosed.

In the drawing:

Fig. 1 is an end view of an annular magnet to be magnetized illustrating the arrangement of the pole shoes of the magnetizing apparatus therein which are shown in section.

Fig. 2 is a sectional view of the annular magnet and pole shoes taken on the line II—II of Fig. 1 with the rest of the magnetizing apparatus shown diagrammatically.

In this drawing, 11 is a ten-pole magnet, which is progressively magnetized by means of two pole shoes 12 and 13 of a simple magnetizing apparatus 14, in such a way that each pole shoe bridges over two poles of the magnet. In this way, progressively, four poles 1, 2, 6 and 7 for example, are always magnetized at the same time, these poles forming two groups, one comprising the poles 1 and 2 and the other comprising the poles 6 and 7. These two groups are separated from one another by the remaining poles 3, 4, 5 and 8, 9, 10, which are not at the time being magnetized. It will be seen that the one pole shoe 12 bridges over the two poles 1, 7 of the same sign as each other on one side of a diameter of the annular magnet, while the other pole shoe 13 bridges over two poles 2, 6 on the other side of the same diameter, which are both of opposite sign to the poles 1, 7. The magnetizing apparatus is then displaced by twice the pole pitch relatively to the annular magnet, so that the pole shoe 12 bridges over the poles 3 and 9 and the pole shoe 13 bridges over the poles 4 and 8. After magnetizing these poles, the magnetizing apparatus is again advanced by twice the pole pitch, thereby magnetizing the poles 5, 1, 6 and 10. Where there is an odd number of pairs of poles, this leads to two of the poles being magnetized twice. In order to remove any inequality of magnetization produced in this way, the magnetizing apparatus is again displaced through twice the pole pitch after its magnetic flux has been reduced and all the poles are again successively magnetized with reduced magnetic flux. The fundamental requirement of progressive magnetization, namely that the poles previously magnetized should not later be demagnetized, is therefore fulfilled, since the magnetic field is closed between the poles 1 and 2 and between the poles 6 and 7, and leaves the other poles, located between these groups, unaffected.

What I claim is:

A method of magnetizing annular magnets having poles on the inner circumference thereof which comprises, simultaneously magnetizing only the two pairs of adjacent poles on opposite sides of the annular magnet by means of two magnetized pole shoes wherein one of the pole shoes bridges only two poles of the same sign on one side of the diameter of the annular magnet and the other pole shoe bridges only two poles of the same sign but of an opposite sign with respect to the first mentioned poles and arranged on the other side of the same diameter, displacing both pole shoes circumferentially through an angle substantially equal to twice the pole pitch and magnetizing the poles opposite the displaced pole shoes, circumferentially displacing the pole shoes through another angular space substantially equal to twice the pole pitch so as to magnetize further poles of the annular magnet, and repeating such displacement of the pole shoes until all poles of the annular magnet are magnetized.

LADISLAV JURÁK.